United States Patent [19]
Yamaguchi et al.

[11] Patent Number: 5,799,744
[45] Date of Patent: Sep. 1, 1998

[54] HYBRID VEHICLE

[75] Inventors: Kozo Yamaguchi; Yoshinori Miyaishi, both of Aichi-ken, Japan

[73] Assignee: Kabushikikaisha Equos Research, Japan

[21] Appl. No.: 556,071

[22] Filed: Nov. 2, 1995

[30] Foreign Application Priority Data

Jan. 30, 1995 [JP] Japan .................. 7-013092

[51] Int. Cl.$^6$ .................................. B60K 6/00
[52] U.S. Cl. ................ 180/65.2; 180/65.6; 475/5
[58] Field of Search ................... 180/291, 292, 180/65.2, 65.3, 65.4, 65.6, 306, 339; 475/5; 74/661

[56] References Cited

U.S. PATENT DOCUMENTS

| | | | |
|---|---|---|---|
| 3,566,717 | 3/1971 | Berman et al. | 180/65.2 |
| 4,804,056 | 2/1989 | Toshikuni et al. | 180/339 |
| 5,433,282 | 7/1995 | Moroto et al. | 180/65.6 |
| 5,492,189 | 2/1996 | Kriegler et al. | 180/65.2 |
| 5,513,719 | 5/1996 | Moroto et al. | 180/65.6 |
| 5,558,173 | 9/1996 | Sherman | 180/65.4 |
| 5,558,175 | 9/1996 | Sherman | 180/65.2 |
| 5,558,588 | 9/1996 | Schmidt | 180/65.2 |

FOREIGN PATENT DOCUMENTS

| | | | |
|---|---|---|---|
| 141362 | 6/1987 | Japan | 180/339 |

*Primary Examiner*—Brian L. Johnson
*Assistant Examiner*—Min Yu
*Attorney, Agent, or Firm*—Lorusso & Loud

[57] ABSTRACT

A hybrid vehicle in which a sufficient amount of oil can be discharged when an internal combustion engine is operated at low speeds, and which can prevent the oil from being excessively discharged when the internal combustion engine is operated at high speeds. The hybrid vehicle has an internal combustion engine, an electric motor, a generator, and an output shaft for transmitting drive force to drive wheels. The hybrid vehicle also has a differential gear unit which is connected to the internal combustion engine, the electric motor, the generator and the output shaft, a rotating unit, and rotation transmitting device for selectively transmitting to the rotating unit whichever is faster of the rotation transmitted from the internal combustion engine to the differential gear unit and the rotation transmitted from the differential gear unit to the generator. With this structure, the rotating unit can be operated by the electric motor when the internal combustion engine is stopped. Moreover, the faster one of the rotation transmitted from the internal combustion engine to the differential gear unit and the rotation transmitted from the differential gear unit to the generator is selected and transmitted to the rotating unit. Accordingly, the rotating unit can be rotated even when the internal combustion engine is operated at low speeds in an idle state or the like.

7 Claims, 3 Drawing Sheets

HYBRID VEHICLE

BACKGROUND OF THE INVENTION

1. Field of the invention

The present invention relates to a hybrid vehicle.

2. Description of the related art

Conventional hybrid vehicles include a drive unit in which an internal combustion engine and an electric motor are used in combination.

Such hybrid vehicles are categorized as series hybrid vehicles, parallel hybrid vehicles or the like. In series hybrid vehicles, a generator is driven by an internal combustion engine to generate electrical energy, by which an electric motor is made to rotate. The rotation of the electric motor is then transmitted to drive wheels. In parallel hybrid vehicles, the drive wheels are directly driven by the internal combustion engine and the electric motor.

In series hybrid vehicles, the internal combustion engine is mechanically separated from the drive train, so that the internal combustion engine can be operated in its most efficient state.

In parallel hybrid vehicles, the internal combustion engine generates most of the required torque while the electric motor generates auxiliary torque. Since only a small amount of mechanical energy need to be converted to electrical energy, the efficiency in transmitting energy is high.

In the above-described hybrid vehicles, an oil pump is disposed on the same axis as the output shaft of the internal combustion engine, as in an ordinary vehicle with an automatic transmission. The oil pump is driven by the internal combustion engine through an oil pump drive mechanism. Thus, the oil pump cools elements which frictionally engage each other and lubricates bearings, gears, an electric motor, etc. (see Japanese Patent Application Laid-Open No. 4-50863).

However, in conventional hybrid vehicles, even when the internal combustion engine is in an idle state and rotates at a low speed, it is necessary to cool elements which frictionally engage each other and lubricate bearings, gears, an electric motor, etc. Therefore, an oil pump having a large capacity is provided to discharge a sufficient amount of oil in the idle state.

In such a case, when the capacity of the oil pump is made large and the internal combustion engine is operated at a high speed during high-speed traveling, the oil pump discharges an excessive amount of oil, so that the fuel consumption rate of the hybrid vehicle increases accordingly.

Although a variable delivery type oil pump can be used, in this case the structure becomes complex, resulting in increased costs.

This problem can be solved by providing an auxiliary oil pump which is driven by an electric motor or the like. In this case, cooling and lubrication can be continued using the auxiliary oil pump when the internal combustion engine is stopped.

However, the provision of the auxiliary oil pump increases the weight of the hybrid vehicle, which in turn increases the fuel consumption rate accordingly. In addition, the hybrid vehicle becomes larger, resulting in increased costs.

When two oil pumps are provided in a hybrid vehicle, the discharge ports of the oil pumps must be connected together, and this increases the structural complexity of the hybrid vehicle.

Moreover, a controller must be provided to individually control the two oil pumps, which also increases costs.

SUMMARY OF THE INVENTION

An object of the present invention is to solve the above-described problems of conventional hybrid vehicles and to provide an improved hybrid vehicle in which a sufficient amount of oil can be discharged when an internal combustion engine is operated at low speeds, and which can prevent the oil from excessively being discharged when the internal combustion engine is operated at high speeds.

To achieve the above object, a hybrid vehicle according to the present invention has an internal combustion engine, an electric motor, a generator, and an output shaft for transmitting drive force to drive wheels.

The hybrid vehicle also has a differential gear unit which is connected to the internal combustion engine, the electric motor, the generator and the output shaft, a rotating unit, and rotation transmitting means for selectively transmitting to the rotating unit whichever is faster of the rotation transmitted from the internal combustion engine to the differential gear unit and the rotation transmitted from the differential gear unit to the generator.

With this structure, the rotating unit can be operated by the electric motor when the internal combustion engine is stopped. Moreover, the faster one of the rotation transmitted from the internal combustion engine to the differential gear unit and the rotation transmitted from the differential gear unit to the generator is selected and transmitted to the rotating unit.

Accordingly, the rotating unit can be rotated even when the internal combustion engine is operated at low speeds in an idle state or the like.

In one embodiment of hybrid vehicle according to the present invention, the rotating unit is an oil pump.

In this case, the oil pump can be operated by the electric motor when the internal combustion engine is stopped. Moreover, the faster one of the rotation transmitted from the internal combustion engine to the differential gear unit and the rotation transmitted from the differential gear unit to the generator is selected and transmitted to the oil pump.

Accordingly, the oil pump can be rotated even when the internal combustion engine is operated at low speeds in an idle state or the like. This eliminates the necessity of providing an auxiliary oil pump which is driven by an electric motor or the like. As a result, the weight of the hybrid vehicle can be reduced accordingly, so that the fuel consumption rate decreases. In addition, the size of the hybrid vehicle can be decreases, and costs can be reduced.

Furthermore, a controller for controlling the oil pump can be simplified.

In still another hybrid vehicle according to the present invention, the differential gear unit comprises a first gear element connected to the generator, a second gear element connected to the internal combustion engine, and a third gear element connected to the electric motor and the output shaft.

Also, the rotation transmitting means selects whichever is faster of the rotation transmitted from the second gear element, and the rotation transmitted to the first gear element and transmits the selected rotation to the rotating unit.

With this structure, the rotating unit can be operated by the electric motor when the internal combustion engine is stopped. Moreover, the faster one of the rotation transmitted from the second gear element and the rotation transmitted to the first gear unit can be selected and transmitted to the rotating unit.

In yet another embodiment of a hybrid vehicle according to the present invention, the differential gear unit has a gear ratio such that when rotation is input to the second gear element while the third gear is fixed, rotation at an increased speed is output to the first gear element.

In this case, when the hybrid vehicle is stopped and the internal combustion engine is operated at low speeds, the rotation of the internal combustion engine is input to the second gear element so that rotation at an increased speed is output to the first gear element.

Accordingly, the rotating unit can be operated at increased speed.

Also, when the hybrid vehicle is caused to travel and the internal combustion engine is operated at high speeds, the rotational speed of the second gear element increases so that the third gear element and the first gear element are rotated at respective speeds corresponding to the gear ratio of the differential gear unit.

Accordingly, the rotating unit can be operated at speed corresponding to the rotational speed of the internal combustion engine.

In the embodiment wherein the rotating unit is an oil pump, when the hybrid vehicle is stopped and the internal combustion engine is operated at low speeds, the rotation of the internal combustion engine is input to the second gear element so that rotation at an increased speed is output to the first gear element.

Accordingly, when the rotation of the first gear element is transmitted to the oil pump, the oil pump can discharge a sufficient amount of oil. Therefore, the size of the oil pump can be decreased.

Also, when the hybrid vehicle is caused to travel and the internal combustion engine is operated at high speeds, the rotational speed of the second gear element increases. In this case, the rotation from the second gear element is transmitted to the oil pump.

Since the oil pump can be operated at speed corresponding to the rotational speed of the internal combustion engine, a sufficient amount of oil can be discharged, and it is also possible to prevent the oil from being excessively discharged.

As described above, a sufficient amount of oil can be discharged from the oil pump even when the internal combustion engine is operated at low speed, and there is no possibility that the oil is excessively discharged when the internal combustion engine is operated at high speeds.

In still another embodiment of the hybrid vehicle according to the present invention, the differential unit is a planetary gear unit, and the first, second and third gear elements are a sun gear, a carrier and a ring gear, respectively.

In this case, the faster one of the rotation of the internal combustion engine transmitted through the carrier and the rotation output from the sun gear with increased speed is selected and transmitted to the oil pump.

In still another embodiment of a hybrid vehicle according to the present invention, the differential gear unit is a bevel gear unit.

In this case, the faster one of the rotation from a second gear element of the bevel gear unit and the rotation from a first gear element of the bevel gear unit is selected and transmitted to the oil pump.

In still another embodiment of a hybrid vehicle according to the present invention, the rotation transmitting means comprises a first and a second one-way clutches, and the rotation transmitted from the internal combustion engine to the differential gear unit is transmitted to the rotating unit via the first one-way clutch while the rotation transmitted from the differential gear unit to the generator is transmitted to the rotating unit via the second one-way clutch.

With this structure, when the rotational speed of the rotation transmitted from the internal combustion engine to the differential gear unit is higher than the rotational speed of the rotation transmitted from the differential gear unit to the generator, the first one-way clutch is brought into a lock state while the second one-way clutch is brought into a free state.

Also, when the rotational speed of the rotation transmitted from the differential gear unit to the generator is higher than the speed of the rotation transmitted from the internal combustion engine to the differential gear unit, the second one-way clutch is brought into a lock state while the first one-way clutch is brought into a free state.

BRIEF DESCRIPTION OF THE DRAWINGS

The structure and features of the hybrid vehicle according to the present invention will be readily appreciated as the same becomes better understood by referring to the accompanying drawings, in which.

DESCRIPTION OF PREFERRED EMBODIMENT

An embodiment of the present invention will now be described in detail with reference to the drawings.

Figure 1:
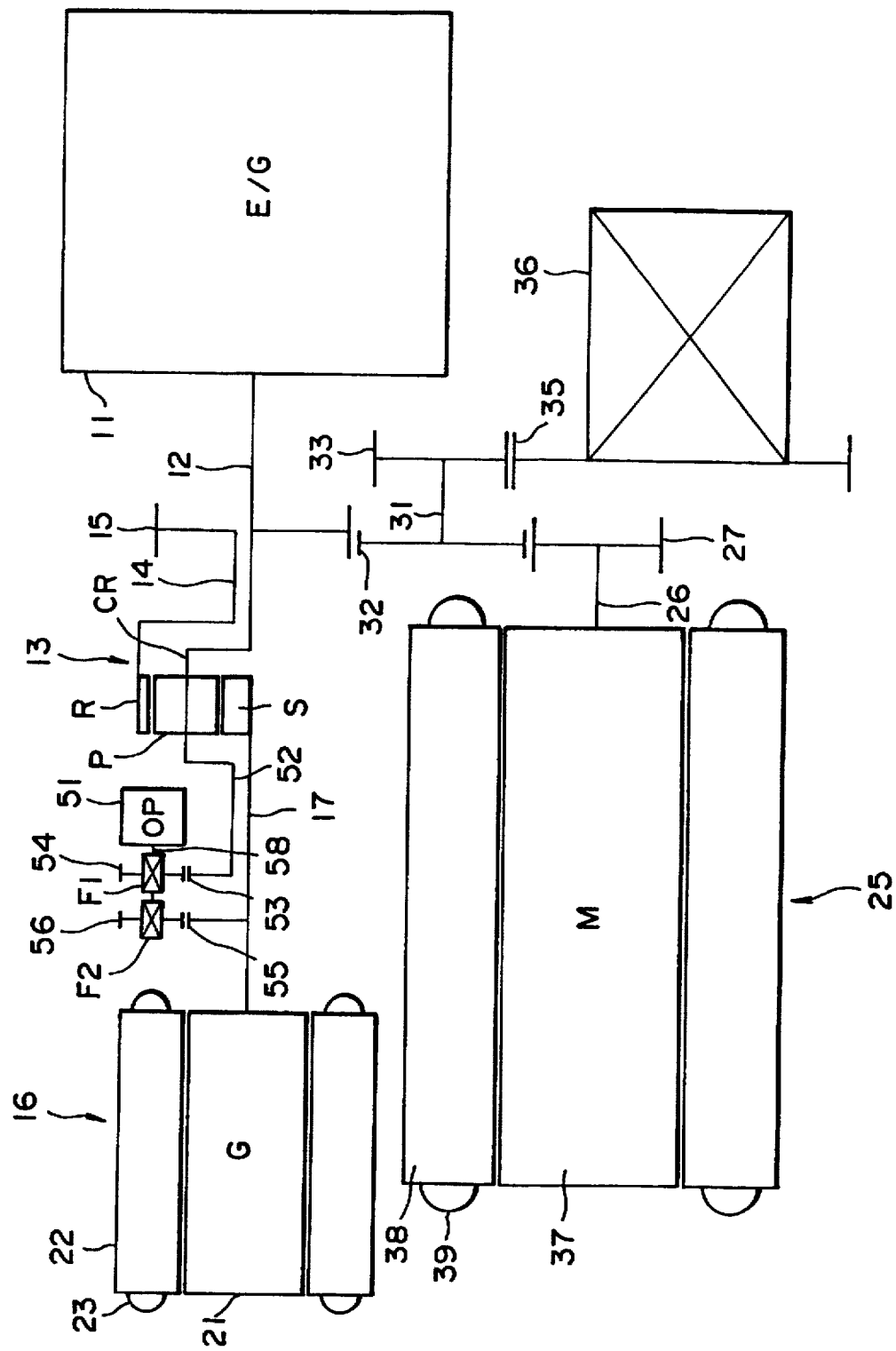
FIG. 1 is a schematic diagram of a hybrid vehicle according to an embodiment of the present invention.

In FIG. 1, numeral 11 denotes an internal combustion engine (E/G), numeral 12 denotes an output shaft for outputting the rotation which is generated by operating the internal combustion engine 11, numeral 13 denotes a planetary gear unit serving as a differential gear unit which changes the speed of the rotation input through the output shaft 12, numeral 14 denotes an output shaft to which rotation having changed speed is output from the planetary gear unit 13, numeral 15 denotes a first gear fixed to the output shaft 14, numeral 16 denotes a generator (G) which is disposed on the same axis as the output shaft 12 of the internal combustion engine 11 and which is connected to the planetary gear unit 13 via a transmission shaft 17. In the present embodiment, the planetary gear unit 13 is used as a differential gear unit. However, a bevel gear unit composed of three or more bevel gears may be used as the differential gear unit.

The output shaft 14 has a sleeve-like shape, and disposed to surround the output shaft 12. The first gear 15 is disposed between the planetary gear unit 13 and the internal combustion engine 11.

The planetary gear unit 13 includes a sun gear S serving as a first gear element, a pinion P meshed with the sun gear S, a carrier CR which rotatably supports the pinion P and serves as a second gear element, and a ring gear R which is meshed with the pinion P and serves as a third gear element.

The sun gear S is connected to the generator 16 via the transmission shaft 17. The ring gear P is connected to the first gear 15 via the output shaft 14. The carrier CR is connected to the internal combustion engine 11 via the output shaft 12.

The generator 16 has a rotor 21 which is coupled to the transmission shaft 17 and is rotatably disposed, a stator 22 disposed to surround the rotor 21, and a winding 23 is wound around the stator 22. The generator 16 generates electrical power by using the rotation transmitted through the transmission shaft 17. The winding 23 is connected to an unillustrated battery so as to supply the battery with current for accumulation.

Numeral 25 denotes an electric motor (M) which receives current from the battery to generate rotation. Numeral 26 denotes an output shaft to which the rotation of the electric motor 25 is output. Numeral 27 denotes a second gear fixed to the output shaft 26. The electric motor 25 includes a rotor 37 fixed to the output shaft 26 and is rotatably disposed, a stator 38 disposed to surround the rotor 37, and a winding 39 applied to the stator 38. The electric motor 25 generates rotation by using current supplied to the winding 39. For this purpose, the winding 39 is connected to the battery to receive current therefrom.

To rotate unillustrated drive wheels in the same direction as the internal combustion engine 11, a counter shaft 31 is disposed as an output shaft, and a third gear 32 is fixed to the counter shaft 31. Also, the third gear 32 is meshed with the first gear 15 and the second gear 27, so that the rotation of the first gear 15 and the rotation of the second gear 27 are transmitted to the third gear 32 while their rotational directions are inverted.

Further, a fourth gear 33 is fixed to the counter shaft 31. The fourth gear 33 has teeth the number of which is fewer than that of the teeth of the third gear 32. A fifth gear 35 is meshed with the fourth gear 33, and a differential unit 36 is coupled to the fifth gear 35. As a result, rotation transmitted to the fifth gear 35 is further transmitted to the drive wheels via the differential unit 36 while providing a differential action.

As described above, not only the rotation generated by the internal combustion engine 11 but also the rotation generated by the electric motor 25 can be transmitted to the third gear 32. Accordingly, the hybrid vehicle can be operated in an engine drive mode in which only the internal combustion engine 11 is operated, a motor drive mode in which only the motor 25 is operated, and an engine/motor drive mode in which the internal combustion engine 11 and the electric motor 25 are both operated. Also, the rotational speed of the transmission shaft 17 is controlled by controlling the current generated by the generator 16, whereby the internal combustion engine 11 can be operated in a range in which the efficiency of the engine is high. In the case where the generator 16 is used as an electric motor, the internal combustion engine 11 can be started by the generator 16.

The rotation of the internal combustion engine 11 is output to the output shaft 12 and is then transmitted to the first gear 15, while the rotation of the electric motor 25 is output to the output shaft 26 and is then transmitted to the second gear 27. Therefore, the gear ratio between the first gear 15 and the third gear 32 can be made different from the gear ratio between the second gear 27 and the third gear 32. Accordingly, the capacities of the internal combustion engine 11 and the electric motor 25 can be freely changed in a wide range, which facilitates the design of the drive apparatus. In detail, the rotational speed of the internal combustion engine 11, which is operated in a range in which the efficiency of the engine is high, is decreased at the gear ratio between the first gear 15 and the third gear 32, and then the rotation having decreased speed is transmitted to the counter shaft 31. Also, the rotational speed of the electric motor 25, which is operated in a range in which the efficiency of the engine is high, is decreased at the gear ratio between the second gear 27 and the third gear 32, and then the rotation having decreased speed is transmitted to the counter shaft 31.

An oil pump (OP) 51 serving as a rotation unit is provided to lubricate the planetary gear unit 13, the first gear 15, the second gear 27, the third gear 32, the forth gear 33, the fifth gear 35, the differential unit 36, various bearings, etc. and to cool the generator 16, the electric motor 25, etc. Oil discharged from the oil pump 51 is supplied to various portions to be lubricated. In the present embodiment, the oil pump 51 is disposed as a rotating unit. However, auxiliary equipment such as an air conditioner can be installed as the rotating unit.

Further, rotation transmitting means is disposed to operate the oil pump 51, and the rotation transmitted from the carrier CR and the rotation transmitted from the sun gear S are selectively transmitted to the oil pump 51 by the rotation transmitting means. A sleeve 52 surrounding the transmission shaft 17 is disposed between the planetary gear unit 13 and the generator 16 and is supported for free rotation with respect to the transmission shaft 17. The sleeve 52 is connected to the carrier CR of the planetary gear unit 13 at one end facing the internal combustion engine 11, and is connected to a first drive gear 53 for driving the oil pump 51 at the other end facing the generator 16. Meanwhile, a driven gear 54 is disposed on the drive shaft 58 of the oil pump 51 via a first one-way clutch F1, and the driven gear 54 is meshed with the first drive gear 53. Accordingly, the rotation of the carrier CR is transmitted to the drive shaft 58 of the oil pump 51 via the first drive gear 53, the driven bear 54 and the first one-way clutch F1 to operate the oil pump 51.

Also, a second drive gear 55 for driving the oil pump 51 is fixed to the transmission shaft 17 at a position between the first drive gear 53 and the generator 16. Meanwhile, a driven gear 56 is disposed on the drive shaft 58 of the oil pump 51 via a second one-way clutch F2, and the driven gear 56 is meshed with the second drive gear 55. Accordingly, the rotation of the sun gear S is transmitted to the drive shaft 58 of the oil pump 51 via the second drive gear 55, the driven gear 56 and the second one-way clutch F2 to operate the oil pump 51.

The first one-way clutch F1 is brought into a lock state when the rotational speed of the driven gear 54 is higher than that of the drive shaft 58 of the oil pump 51, and is brought into a free state when the rotational speed of the driven gear 54 is equal to or lower than that of the drive shaft 58 of the oil pump 51. The second one-way clutch F2 is brought into a lock state when the rotational speed of the driven gear 56 is higher than that of the drive shaft 58 of the oil pump 51, and is brought into a free state when the rotational speed of the driven gear 56 is equal to or lower than that of the drive shaft 58 of the oil pump 51.

Accordingly, the faster one of the rotation of the driven gear 54 and the rotation of the driven gear 56 is transmitted to the drive shaft 58 to operate the oil pump 51. In the present embodiment, the gear ratio between the first drive gear 53 and the driven gear 54 is equal to the gear ratio between the second drive gear 55 and the driven gear 56. Accordingly, the oil pump 51 is operated by the faster one of the rotation of the carrier CR and the rotation of the sun gear S.

The gear ratio of the planetary gear unit 13 is set such that the rotational speed of the sun gear S is greater than the rotational speed of the carrier CR when the rotation of the internal combustion engine 11 is transmitted to the planetary gear unit 13 in a state in which the vehicle is stopped.

In the present embodiment, the sun gear S is connected to the generator 16, the ring gear R is connected to the first gear 15, and the carrier CR is connected to the internal combustion engine 11. However, this structure may be modified such that the sun gear S is connected to the first gear 15, the ring gear R is connected to the generator 16, and the carrier CR is connected to the internal combustion engine 11, and that the gear ratio of the planetary gear unit 13 is set to make the rotational speed of the ring gear R greater than that of the carrier CR. In this case, the ring gear R serves as the first gear element, the carrier CR serves as the second gear element, and the sun gear S serves as the third gear element.

Moreover, another structure may be employed in which the sun gear S is connected to the generator 16, the ring gear R is connected to the internal combustion engine 11, and the carrier CR is connected to the first gear 15, and in which the gear ratio of the planetary gear unit 13 is set to make the rotational speed of the sun gear S greater than that of the ring gear R. In this case, the sun gear S serves as the first gear element, the ring gear R serves as the second gear element, and the carrier CR serves as the third gear element.

In the present embodiment, the gear ratio of the planetary gear 13 is set such that the rotational speed of the first gear element connected to the generator 16 becomes greater than that of the second gear element connected to the internal combustion engine 11, and the gear ratio between the first drive gear 53 and the driven gear 54 is set to be equal to the gear ratio between the second drive gear 55 and the driven gear 56. However, the gear ratio between the first drive gear 53 and the driven gear 54 can be set to be different from the gear ratio between the second drive gear 55 and the driven gear 56.

Next, operation of the hybrid vehicle having the above-described structure will be described.

Figure 2:
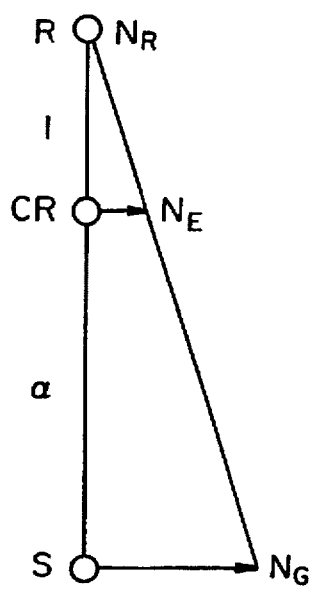
FIG. 2 is a velocity diagram at the time when the hybrid vehicle according to the embodiment of the present invention is stopped.
Figure 3:
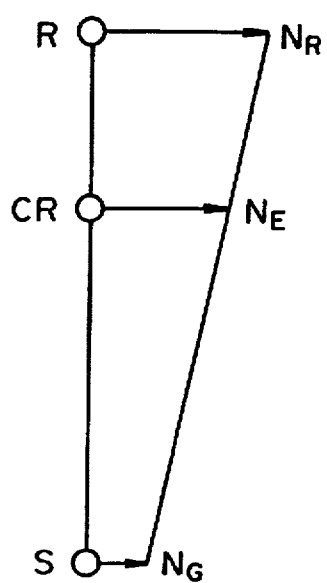
FIG. 3 is a velocity diagram at the time when the hybrid vehicle according to the embodiment of the present invention is traveling.

FIG. 2 is a velocity diagram at the time when the hybrid vehicle according to the embodiment of the present invention is stopped, and FIG. 3 is a velocity diagram at the time when the hybrid vehicle according to the embodiment of the present invention is traveling.

The rotational speed $N_G$ of the generator 16 (FIG. 1) is expressed as follows:

$$N_G = 3N_E - 2N_R,$$

wherein $N_E$ is the rotational speed of the internal combustion engine 11, and $N_R$ is the rotational speed of the output shaft 50 (the rotational speed of the ring gear R).

When the hybrid vehicle is stopped, the internal combustion engine 11 is operated at low speeds. Since the unillustrated drive wheels are stopped in such a state, the ring gear R of the planetary gear unit 13 is fixed. When the internal combustion engine 11 is rotated at an idle speed, the rotation of the internal combustion engine 11 is input to the carrier CR through the output shaft 12 and is output from the sun gear S. Also, when the gear ratio of the planetary gear unit 13 is set such that the number of the teeth of the ring gear R is $\alpha$ times (two times in the present embodiment) the number of the teeth of the sun gear S, the rotational speed of the sun gear S becomes $(\alpha+1)$ times (three times in the present embodiment) the rotational speed $N_E$ of the internal combustion engine 11, as shown in FIG. 2.

The rotation of the sun gear S is transmitted to the drive shaft 58 via the transmission shaft 17, the second drive gear 55, the driven bear 56 and the second one-way clutch F2 to operate the oil pump 51, so that a sufficient amount of oil can be discharged. Accordingly, the size of the oil pump 51 can be reduced.

When the hybrid vehicle is caused to travel, the internal combustion engine 11 is operated at high speeds. Accordingly, the rotational speed of the carrier CR increases, and the ring gear R and the sun gear S are therefore rotated at respective speeds corresponding to the gear ratio of the planetary gear unit 13, as shown in FIG. 3. The rotation of the carrier CR is transmitted to the drive shaft 58 via the sleeve 52, the first drive gear 53, the driven gear 54 and the first one-way clutch F1 to operate the oil pump 51 at speed corresponding to the rotational speed $N_E$ of the internal combustion engine 11. As a result, sufficient amount of oil can be discharged, and the oil is prevented from being excessively discharged.

As described above, a sufficient amount of oil can be discharged from the oil pump 51 when the internal combustion engine 11 is operated at low speeds, and oil is prevented from being excessively discharged when the internal combustion engine 11 is operated at high speeds.

Next, the detail of rotation transmitting means and the oil pump 51 will be described.

Figure 4:
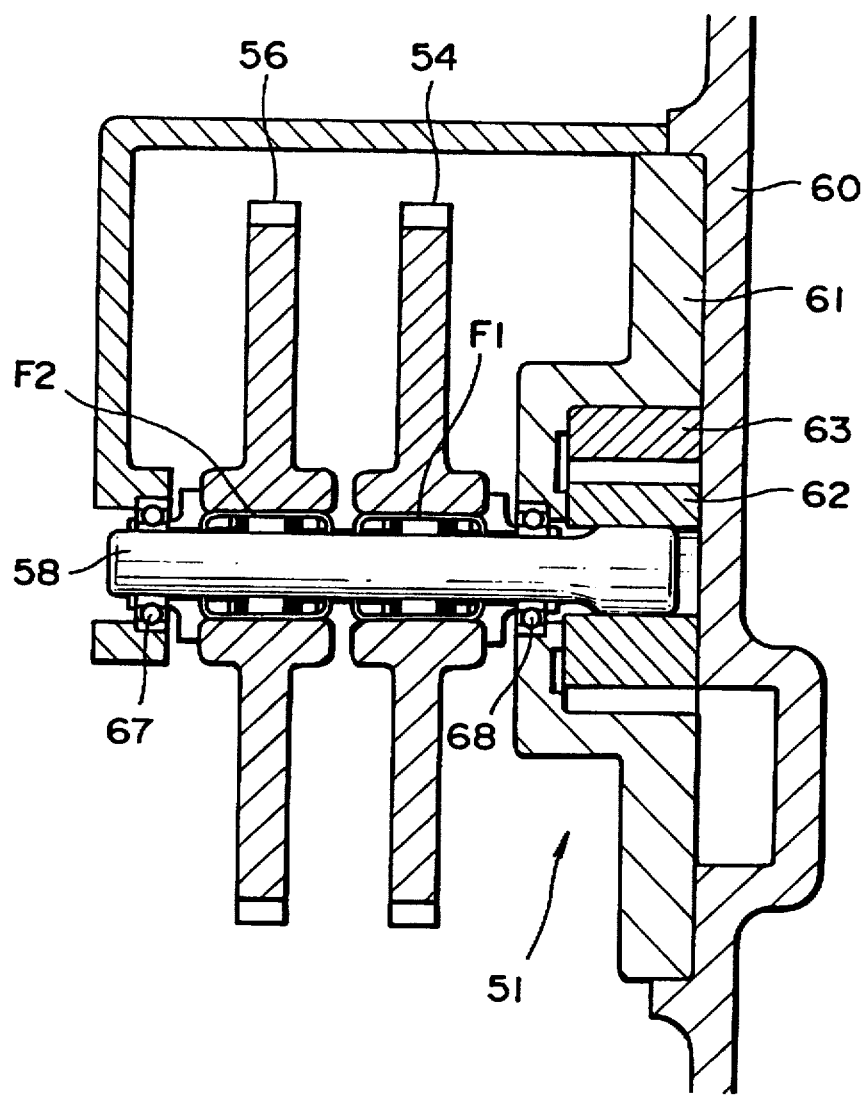
FIG. 4 is a sectional view of a main portion of rotation transmitting means and an oil pump used in an embodiment of the present invention.

FIG. 4 is a sectional view of a main portion of rotation transmitting means and an oil pump used in an embodiment of the present invention.

In FIG. 4, numeral 51 denotes a trochoid oil pump, numeral 54 denotes the driven gear meshed with the first drive gear 53 (see FIG. 1), numeral 56 denotes the driven gear meshed with the second drive gear 55, numeral 58 denote the drive shaft, symbol F1 is the first one-way clutch, and symbol F2 denotes the second one-way clutch.

Numeral 60 denotes a casing of the hybrid vehicle, and the oil pump 51 is fixed to the casing 60. Numeral 61 denotes an oil pump case, which a drive rotor 62 and a driven rotor 63 which houses is meshed with the drive rotor 62 at the circumference thereof. The opposite ends of the drive shaft 58 are supported by bearings 67 and 68 for free rotation.

The present invention is not limited to the above-described embodiments. Numerous modifications and veriations of the present invention are possible in light of the spirit of the present invention, and they are not excluded from the scope of the present invention.

What is claimed is:

1. A hybrid vehicle comprising:
   (a) an internal combustion engine for output of engine rotation;
   (b) an electric motor for output of motor rotation;
   (c) a generator;
   (d) an output shaft for transmitting the output engine rotation and the output motor rotation to drive wheels;
   (e) a differential gear unit which is connected to said internal combustion engine, said electric motor, said generator and said output shaft;
   (f) an oil pump; and
   (g) rotation transmitting means for selectively transmitting to said oil pump the faster of the rotation transmitted from said internal combustion engine to said differential gear unit and the rotation transmitted from said differential gear unit to said generator.

2. A hybrid vehicle according to claim 1, in which;
   (a) said differential gear unit comprises a first gear element connected to said generator, a second gear element connected to said internal combustion engine, and a third gear element connected to said electric motor and said output shaft; and (b) said rotation transmitting means selects whichever is faster of the rotation transmitted from said second gear element and the rotation transmitted from said first gear element and transmits the selected rotation to said oil pumps.

3. A hybrid vehicle according to claim 2, in which said differential gear unit has a gear ratio such that when rotation is input to said second gear element while said third gear is fixed, rotation having increased speed is output from said first gear element.

4. A hybrid vehicle according to claim 2, in which said differential unit is a planetary gear unit, and said first, second and third gear elements are a sun gear, a carrier and a ring gear, respectively.

5. A hybrid vehicle according to claim 2, in which said differential gear unit is a bevel gear unit.

6. A hybrid vehicle according to claim 1, in which said rotation transmitting means comprises first and second one-way clutches, and the rotation transmitted from said internal combustion engine to said differential gear unit is transmitted to said oil pump via said first one-way clutch while the rotation transmitted from said differential gear unit to said generator is transmitted to said oil pump via said second one-way clutch.

7. A hybrid vehicle according to claim 1, wherein said generator is operable both in a generating mode to generate electricity and in a motor mode.

* * * * *

UNITED STATES PATENT AND TRADEMARK OFFICE
CERTIFICATE OF CORRECTION

PATENT NO. : 5,799,744
DATED : September 1, 1998
INVENTOR(S) : YAMAGUCHI et al

It is certified that error appears in the above-indentified patent and that said Letters Patent is hereby corrected as shown below:

Col. 4, line 67, "P" should read --R--.

Col. 8, line 35, after "which" insert --houses--; and
      line 36, delete "houses".

Col. 9, line 5, delete "pumps" and insert --pump--.

Signed and Sealed this

Twenty-fourth Day of August, 1999

Attest:

Attesting Officer

Q. TODD DICKINSON

Acting Commissioner of Patents and Trademarks